US010654415B2

(12) United States Patent
Lewis et al.

(10) Patent No.: US 10,654,415 B2
(45) Date of Patent: May 19, 2020

(54) SYSTEM AND METHOD FOR DETERMINING A STARTING POINT OF A GUIDANCE LINE FOR ATTACHING A TRAILER TO A TRAILER HITCH MOUNTED IN A CARGO BED OF A VEHICLE (71) Applicant: GM Global Technology Operations LLC, Detroit, MI (US)

(72) Inventors: Allan K. Lewis, Windsor (CA); Mohammad Naserian, Windsor (CA); Michael J. Bliss, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 334 days.

(21) Appl. No.: 15/581,458

(22) Filed: Apr. 28, 2017

(65) Prior Publication Data
US 2018/0312112 A1 Nov. 1, 2018

(51) Int. Cl.
*G06K 9/00* (2006.01)
*B60R 1/00* (2006.01)
(52) U.S. Cl.
CPC .......... *B60R 1/003* (2013.01); *B60R 1/00* (2013.01); *G06K 9/00791* (2013.01);
(Continued)
(58) Field of Classification Search
CPC .. B62D 53/08; B62D 35/001; B62D 53/0842; B62D 13/06; B62D 15/027;
(Continued)

(56) References Cited

U.S. PATENT DOCUMENTS 6,539,303 B2 * 3/2003 McClure .............. A01B 69/008
180/204
6,937,165 B2 * 8/2005 Rogers ................... G08G 1/167
340/961

(Continued)

OTHER PUBLICATIONS

Webpage in PDF of https://digitised-collections.unimelb.edu.au/handle/11343/24848 with link to Commercial Transport, [retrieved Jan. 11, 2020], 1 web page. (Year: 2020).*

(Continued)

*Primary Examiner* — Andrew M Moyer
*Assistant Examiner* — Dennis Rosario
(74) *Attorney, Agent, or Firm* — Harness, Dickey & Pierce, P.L.C.

(57) ABSTRACT

A system according to the present disclosure includes an edge detection module, a hitch identification module, a guidance line module, and a display control module. The edge detection module detects edges of an object within an image of a cargo bed of a vehicle. The hitch identification module identifies at least one of a type of a trailer hitch attached to the cargo bed and a size of the trailer hitch based on the detected edges of the object. The guidance line module determines a starting point of a guidance line for connecting a trailer to the trailer hitch based on at least one of the type of the trailer hitch and the size of the trailer hitch. The display control module controls an electronic display to display the image of the cargo bed and to display the guidance line on the image of the cargo bed.

8 Claims, 9 Drawing Sheets

(52) U.S. Cl.
CPC ... *B60R 2300/305* (2013.01); *B60R 2300/802* (2013.01); *B60R 2300/808* (2013.01); *G06T 2207/30252* (2013.01)

(58) Field of Classification Search
CPC .............. B62D 15/025; B62D 15/0275; B62D 15/0285; B62D 15/0295; B62D 15/021; B62D 6/002; B62D 1/02; B62D 15/024; B62D 15/029; B62D 53/0864; B62D 13/00; B62D 15/023; B62D 15/028; B62D 53/065; B60D 1/015; B60D 1/06; B60D 1/62; B60D 1/58; B60D 1/36; B60D 1/065; B60D 1/07; B60D 1/075; B60D 1/245; B60D 1/00; B60D 1/363; B60R 1/00; B60R 2300/105; B60R 1/003; B60R 2300/808; B60R 11/04; B60R 2300/302; B60R 2001/1253; B60R 2300/806; B60R 2300/8026; B60R 2011/004; G05D 2201/0201; B60W 10/20; B60W 2520/22; B60W 30/18036; B60W 2300/14; B60W 2420/42; G06K 9/00791; G06T 2207/30252
See application file for complete search history.

(56) References Cited

U.S. PATENT DOCUMENTS

| | | | | |
|---|---|---|---|---|
| 8,976,246 | B1* | 3/2015 | Rappuhn | B60D 1/62 348/148 |
| 9,495,876 | B2* | 11/2016 | Lu | B60R 1/00 |
| 9,904,859 | B2* | 2/2018 | Grauer | G01S 17/107 |
| 10,150,505 | B2* | 12/2018 | Herzog | B60D 1/36 |
| 2005/0074143 | A1* | 4/2005 | Kawai | B60D 1/36 382/104 |
| 2014/0267415 | A1* | 9/2014 | Tang | G06T 11/60 345/633 |
| 2015/0115571 | A1* | 4/2015 | Zhang | B60D 1/06 280/477 |
| 2018/0081370 | A1* | 3/2018 | Miller | B60W 10/04 |

OTHER PUBLICATIONS

Turner et al., A Synthesis of Safety Implications of Oversize/Overweight Commercial Vehicles, Jun. 2009 [retrieved Jan. 10, 2020], UTCA Report No. 07115, 99 pages. Retrieved: http://utca.eng.ua.edu/files/2011/10/07115-Final-Report.pdf (Year: 2009).*

* cited by examiner

SYSTEM AND METHOD FOR DETERMINING A STARTING POINT OF A GUIDANCE LINE FOR ATTACHING A TRAILER TO A TRAILER HITCH MOUNTED IN A CARGO BED OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for determining a starting point of a guidance line for attaching a trailer to a trailer hitch mounted in a cargo bed of a vehicle.

Some pickup trucks have a trailer hitch mounted to a cargo bed of the pickup truck above a rear axle of the pickup truck. These types are trailer hitches are typically either a fifth wheel hitch or a gooseneck hitch. A fifth wheel hitch typically includes a U-shaped coupling mounted a foot or more above the cargo bed of the pickup truck. Thus, a fifth wheel hitch is similar to trailer hitches typically mounted on semi trucks. A gooseneck hitch includes a ball mounted on the cargo bed of the pickup track. Thus, a gooseneck hitch is similar to trailer hitches typically mounted to the rear end of the frame of a pickup truck.

To attach a fifth wheel trailer to a fifth wheel hitch on a pickup truck, a driver drives the pickup truck in reverse to position a kingpin of the fifth wheel trailer within a U-shaped pocket in the fifth wheel hitch. To attach a gooseneck trailer to a gooseneck hitch on a pickup truck, a driver drives the pickup truck in reverse to position a tongue of the fifth wheel trailer within a U-shaped pocket in the fifth wheel hitch. In either case, when reversing the pickup truck, the driver attempts to position a steering wheel of the pickup truck at a proper angle so that the fifth wheel hitch or gooseneck hitch arrives at the desired position.

SUMMARY

A system according to the present disclosure includes an edge detection module, a hitch identification module, a guidance line module, and a display control module. The edge detection module is configured to detect edges of an object within an image of a cargo bed of a vehicle. The hitch identification module is configured to identify at least one of a type of a trailer hitch attached to the cargo bed and a size of the trailer hitch based on the detected edges of the object. The guidance line module is configured to determine a starting point of a guidance line for connecting a trailer to the trailer hitch based on at least one of the type of the trailer hitch and the size of the trailer hitch. The display control module is configured to control an electronic display to display the image of the cargo bed and to display the guidance line on the image of the cargo bed.

In one aspect, the hitch identification module is configured to identify the type of the trailer hitch, and the guidance line module is configured to determine the starting point of the guidance line based on the type of the trailer hitch.

In one aspect, the hitch identification module is configured to identify a height of the trailer hitch, and the guidance line module is configured to determine the starting point of the guidance line further based on the height of the trailer hitch.

In one aspect, the edge detection module is configured to detect edges an object within a fifth wheel envelop that includes a first portion of the image of the cargo bed, and the hitch identification module is configured to identify whether the trailer hitch is a fifth wheel hitch based on the detected edges of the object.

In one aspect, the edge detection module is configured to detect edges of an object within a gooseneck envelop that includes a second portion of the image of the cargo bed, and the hitch identification module is configured to identify whether the trailer hitch is a gooseneck hitch based on the detected edges of the object.

In one aspect, the edge detection module is configured to detect edges of an object within the gooseneck envelop when the hitch identification module identifies that no fifth wheel hitch is present within the fifth wheel envelop.

In one aspect, the fifth wheel envelop has a first predetermined size, and the gooseneck envelop has a second predetermined size that is less than the first predetermined size.

In one aspect, the edge detection module is configured to detect edges of the cargo bed, and at least one of the fifth wheel envelop and the gooseneck envelop have a predetermined location relative to the detected edges of the cargo bed.

In one aspect, the guidance line module is configured to determine a curvature of the guidance line based on an angle of a steering wheel of the vehicle.

In one aspect, the guidance line module is configured to determine a length of the guidance line based on a distance between the trailer hitch and a rear end of the vehicle.

A method according to the present disclosure includes detecting edges of an object within an image of a cargo bed of a vehicle and identifying at least one of a type of a trailer hitch attached to the cargo bed and a size of the trailer hitch based on the detected edges of the object. The method further includes determining a starting point of a guidance line for connecting a trailer to the trailer hitch based on at least one of the type of the trailer hitch and the size of the trailer hitch, and controlling an electronic display to display the image of the cargo bed and to display the guidance line on the image of the cargo bed.

In one aspect, the method further includes identifying the type of the trailer hitch, and determining the starting point of the guidance line based on the type of the trailer hitch.

In one aspect, the method further includes identifying a height of the trailer hitch, and determining the starting point of the guidance line further based on the height of the trailer hitch.

In one aspect, the method further includes detecting edges an object within a fifth wheel envelop that includes a first portion of the image of the cargo bed, and identifying whether the trailer hitch is a fifth wheel hitch based on the detected edges of the object.

In one aspect, the method further includes detecting edges of an object within a gooseneck envelop that includes a second portion of the image of the cargo bed, and identifying whether the trailer hitch is a gooseneck hitch based on the detected edges of the object.

In one aspect, the method further includes detecting edges of an object within the gooseneck envelop in response to identifying that no fifth wheel hitch is present within the fifth wheel envelop.

In one aspect, the fifth wheel envelop has a first predetermined size, and the gooseneck envelop has a second predetermined size that is less than the first predetermined size.

In one aspect, the method further includes detecting edges of the cargo bed, wherein at least one of the fifth wheel envelop and the gooseneck envelop have a predetermined location relative to the detected edges of the cargo bed.

In one aspect, the method further includes determining a curvature of the guidance line based on an angle of a steering wheel of the vehicle.

In one aspect, the method further includes determining a length of the guidance line based on a distance between the trailer hitch and a rear end of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Trailering guidance systems for a trailer hitch mounted in a cargo bed of a pickup typically include a camera that captures an image of the cargo bed and a display within an interior of the vehicle that displays the image within view of the driver. Some trailering guidance systems overlay a guidance line on the image to indicate a future path of the trailer hitch as the driver reverses the pickup. These trailering guidance systems typically adjust the curvature of the guidance line based on the angle or position of a steering wheel.

The starting point of the guidance line, or the location where the guidance line begins to curve, should correspond to the hitching point where the trailer is hitched to the trailer hitch. For example, the hitching point of a fifth wheel hitch is within the U-shaped pocket, and the hitching point of a gooseneck hitch is the uppermost point of the ball. If the starting point of the guidance line does not correspond to the hitching point, the guidance line is not an accurate indicator of the future path of the hitching point. As a result, the guidance line does not assist the driver in determining how to turn the steering wheel while reversing the pickup so that the hitching point arrives at the desired position relative to the trailer.

A system and method according to the present disclosure the type of hitch mounted to a cargo bed of a pickup, determines the height of the hitch, and determines the starting point of the guidance line based on the hitch type and the hitch height. The system and method determines the hitch type by detecting edges of objects within the image generated by the carbo bed camera, and determining whether the detected edges correspond to a known type of trailer hitch (e.g., fifth wheel hitch or gooseneck hitch). The system and method determines the height of a hitch by determining the distance between two points and/or edges of the hitch.

The system and method sets the starting point of the guidance line at or near a hitching point that corresponds to the hitch type and height. Determining the starting point of the guidance line in this manner ensures that the starting point of the guidance line corresponds to the hitching point. As a result, the guidance line assists the driver in determining how to turn the steering wheel while reversing the pickup so that the hitching point arrives at the desired position relative to the trailer.

Figure 1:
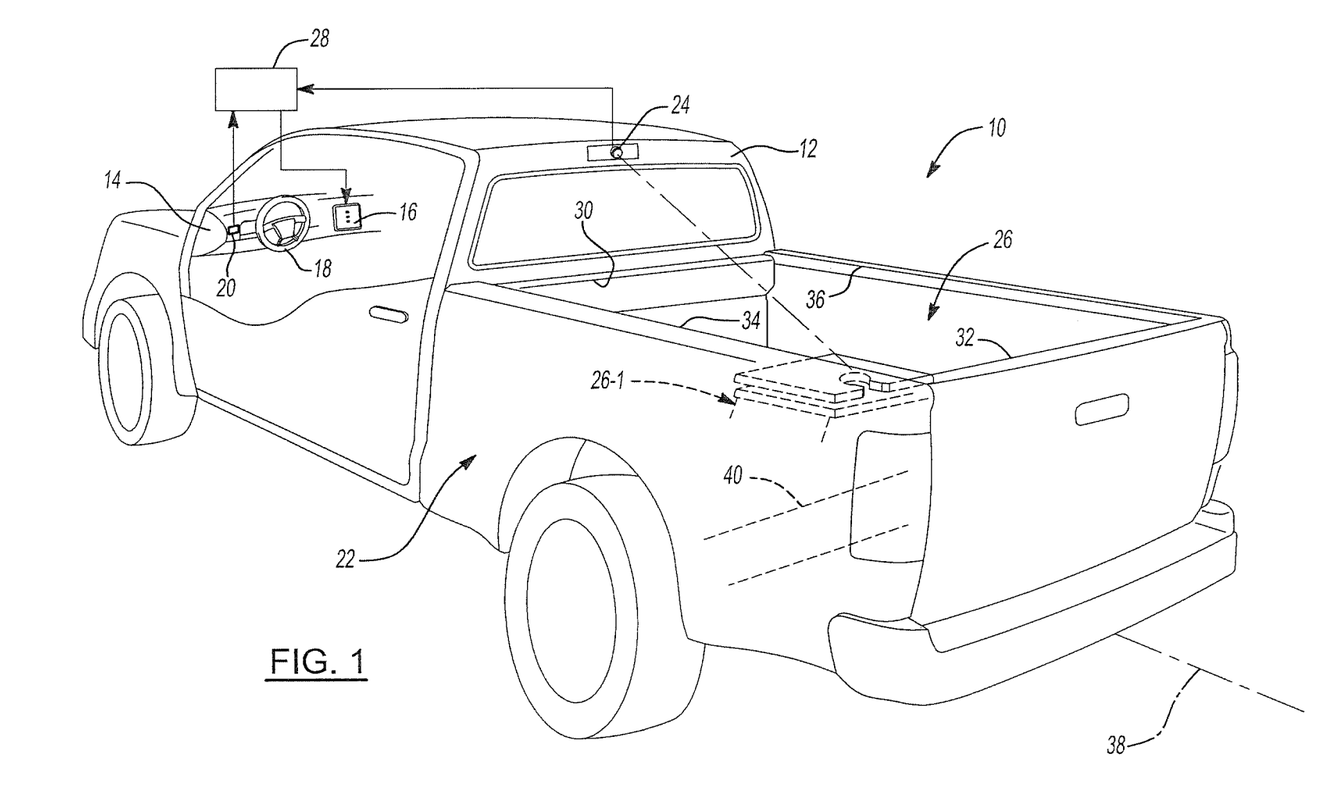
FIG. 1 is a perspective view of an example vehicle according to the principles of the present disclosure.
Figures 2A, 2B:
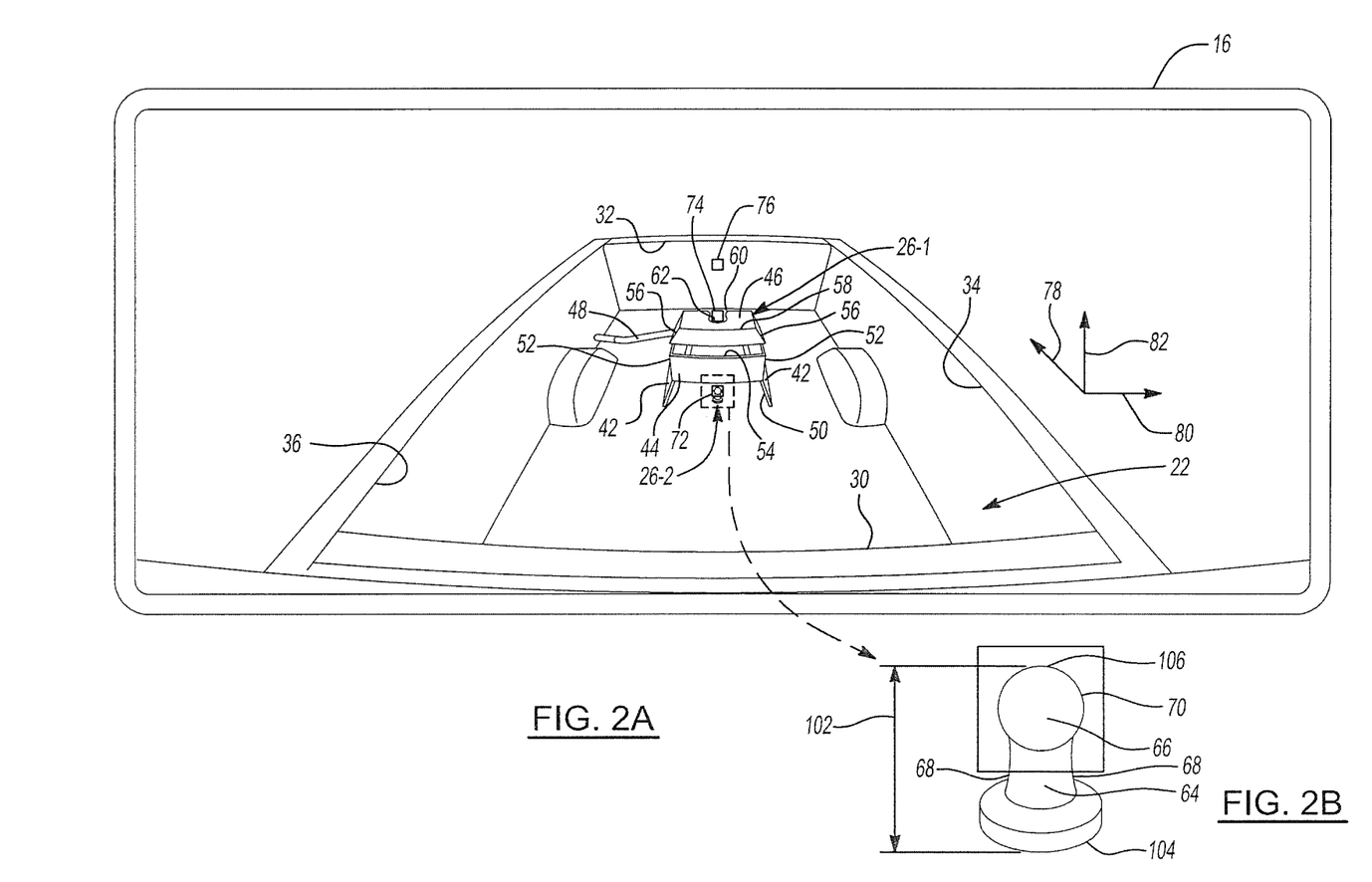
FIG. 2A is an example image of a cargo bed of the vehicle of FIG. 1 according to the principles of the present disclosure.
FIG. 2B is an enlarged view of a portion of FIG. 2A within box 2B.

Referring now to FIGS. 1, 2A, and 2B, an example vehicle 10 includes a cab 12, an instrument panel 14, an electronic display 16, a steering wheel 18, a steering wheel angle (SWA) sensor 20, a cargo bed 22, a cargo bed camera 24, one or more trailer hitches 26, and a trailering assist module 28. The vehicle 10 may be a pickup as shown. The display 16 may be located in the instrument panel 14 as show, in a rear view mirror (now shown), and/or in another suitable location that is visible to a driver of the vehicle 10.

The SWA sensor 20 measures the angular position of the steering wheel 18. The cargo bed 22 has a front interior edge 30, a rear interior edge 32, a left side interior edge 34, and a right side interior edge 36. The cargo bed camera 24 generates an image of the cargo bed 22. The image generated by the cargo bed camera 24 may include the front interior edge 30, the rear interior edge 32, the left side interior edge 34, and the right side interior edge 36. The display 16 is operable to display the image generated by the cargo bed camera 24.

The trailer hitches 26 are mounted to the cargo bed 22 along a central longitudinal axis 38 of the vehicle 10 and at or near a location disposed directly above a rear axle 40 of the vehicle 10. The trailer hitches 26 include a fifth wheel hitch 26-1 and a gooseneck hitch 26-2 (FIGS. 2A and 2B). The fifth wheel hitch 26-1 includes side brackets or legs 42, a base 44, a head 46, and a lever 48. The legs 42 have vertical front edges 50, the base 44 has vertical front edges 52 and horizontal front edges 54, and the head 46 has vertical front edges 56 and horizontal front edges 58. In addition, the head 46 has a rear horizontal edge 60 that defines a U-shaped pocket 62, which receives the kingpin of a fifth wheel trailer.

The gooseneck hitch 26-2 includes a shank 64 and a ball 66 over which the tongue of a gooseneck trailer fits. The shank 64 has vertical side edges 68, and the ball 66 has a circular outer perimeter edge 70. Although the vehicle 10 is shown as including both the fifth wheel hitch 26-1 and the gooseneck hitch 26-2, the vehicle 10 may include only the fifth wheel hitch 26-1 or only the gooseneck hitch 26-2. In addition, the trailer hitches 26 may be attached to the cargo bed 22 in a manner that allows the trailer hitches 26 to be disassembled from the cargo bed 22 without damaging the cargo bed 22 or the trailer hitches 26.

The trailering assist module 28 generates a hitching aid guidance line for attaching a trailer to one of the trailer hitches 26, and controls the display 16 to display the guidance line over the image generated by the cargo bed camera 24. The trailering assist module 28 determines a starting point, a curvature, and a length of the guidance line. The trailering assist module 28 determines the starting point and length of the guidance line based on the image generated by the cargo bed camera 24. The trailering assist module 28 determines the curvature of the guidance line based on the steering wheel angle measured by the SWA sensor 20.

FIGS. 2A and 2B show an example of an image generated by the cargo bed camera 24. The image includes the trailer hitches 26 and the interior edges of the cargo bed 22 including the front interior edge 30, the rear interior edge 32, the left side interior edge 34, and the right side interior edge 36. FIG. 2A also shows a first hitching point 72, a second hitching point 74, and a third hitching point 76. Each of the hitching points 72, 74, 76 is a location where a trailer attaches to one of the trailer hitches 26. The first, second, and third hitching points 72, 74, and 76 are located at the same point along an x-axis 78 of the vehicle 10 and along a y-axis 80 of the vehicle 10, and at different points along a z-axis 82 of the vehicle 10.

The first hitching point 72 is the location where the tongue of a gooseneck trailer fits over the ball 66 of the gooseneck hitch 26-2. The second hitching point 74 is the location where the kingpin of a fifth wheel trailer is received within the U-shaped pocket 62 of the fifth wheel hitch 26-1. The third hitching point 76 is the location where the kingpin of a fifth wheel trailer is received within a U-shaped pocket of a second fifth wheel hitch (not shown) that has a different height than the fifth wheel hitch 26-1. For example, the fifth wheel hitch 26-1 may have a height of 13.5 inches, and the second fifth wheel hitch may have a height of 22.2 inches.

Figure 3:
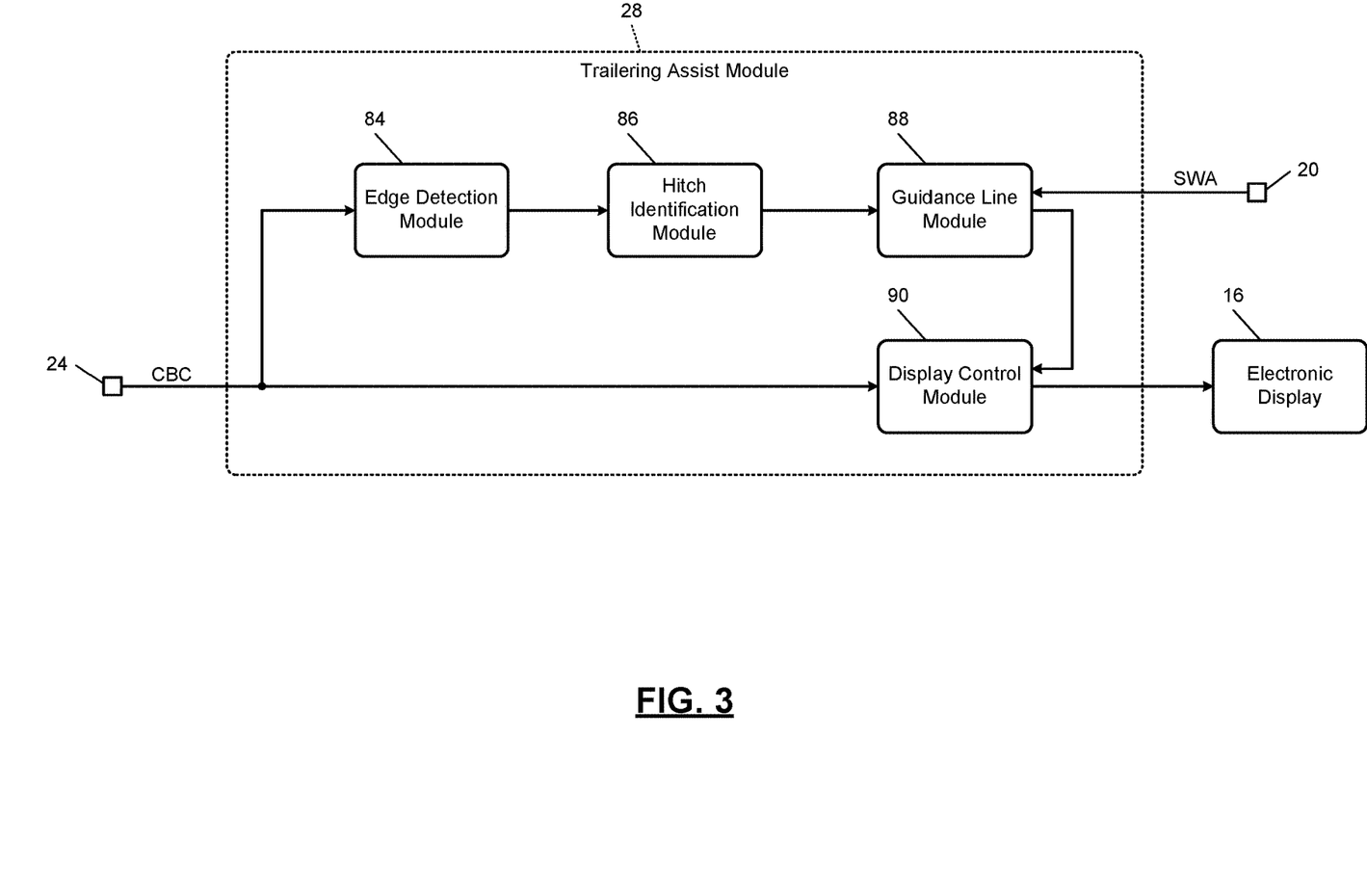
FIG. 3 is a functional block diagram of an example trailering assist module of the vehicle of FIG. 1 according to the principles of the present disclosure.

Referring now to FIG. 3, an example implementation of the trailering assist module 28 includes an edge detection module 84, a hitch identification module 86, a guidance line module 88, and a display control module 90. The edge detection module 84 detects edges of objects in the image generated by the cargo bed camera 24 and outputs a signal indicating the locations of the edges detected. For example, the edge detection module 84 detects edges of the cargo bed 22 including the front interior edge 30, the rear interior edge 32, the left side interior edge 34, and the right side interior edge 36.

The edge detection module 84 also detects the edges of other objects in the image generated by the cargo bed camera 24. For example, the edge detection module 84 detects various edges of the trailer hitches 26. The edges of the trailer hitches 26 detected by the edge detection module 84 may include longitudinal edges (e.g., edges generally aligned with the x-axis 78), lateral edges (e.g., edges generally aligned with the y-axis 80), and/or vertical edges (e.g., edges generally aligned with the z-axis 82). The longitudinal and lateral edges of the trailer hitches 26 may be referred to as horizontal edges. In addition, the edges of the trailer hitches 26 detected by the edge detection module 84 may include straight edges and/or curved edges.

The edges of the fifth wheel hitch 26-1 detected by the edge detection module 84 may include the vertical front edges 50 of the legs 42, the vertical front edges 52 of the base 44, the horizontal front edges 54 of the base 44, the vertical front edges 56 of the head 46, and/or the horizontal front edges 58 of the head 46. The edges of the gooseneck hitch 26-2 detected by the edge detection module 84 may include the vertical side edges 68 of the shank 64 and/or the outer perimeter edge 70 of the ball 66.

The edge detection module 84 may detect the edges of the cargo bed 22, the trailer hitches 26, and other objects in the image generated by the cargo bed camera 24 by identify points in the image where the brightness changes sharply (e.g., by greater than a predetermined value). For example, the gooseneck hitch 26-2 may have a glossy silver surface, and the cargo bed 22 may have a black matte surface. Thus, the brightness of the gooseneck hitch 26-2 may be greater than the brightness of the cargo bed 22. Therefore, the edge detection module 84 may detect the edges 68, 70 of the gooseneck hitch 26-2 at locations where the brightness of the image changes by an amount that is equal to, or within a predetermined range of, a predetermined difference between the brightness of the gooseneck hitch 26-2 and the brightness of the cargo bed 22.

In addition, rather than analyzing the entire image generated by the cargo bed camera 24, the edge detection module 84 may only analyze portions of the image where the trailer hitches 26 are expected to be located. Analyzing portions of the image rather than the entire image reduces the amount of processing power required by the edge detection module 84. In one example, shown in FIG. 4, the edge detection module 84 analyzes a portion of the image generated by the cargo bed camera 24 that is disposed within a fifth wheel envelop 92 where the fifth wheel hitch 26-1 is expected to be located. In another example, shown in FIG. 5, the edge detection module 84 analyzes a portion of the image generated by the cargo bed camera 24 that is disposed within a gooseneck envelop 94 where the fifth wheel hitch 26-1 is expected to be located.

Figure 4:
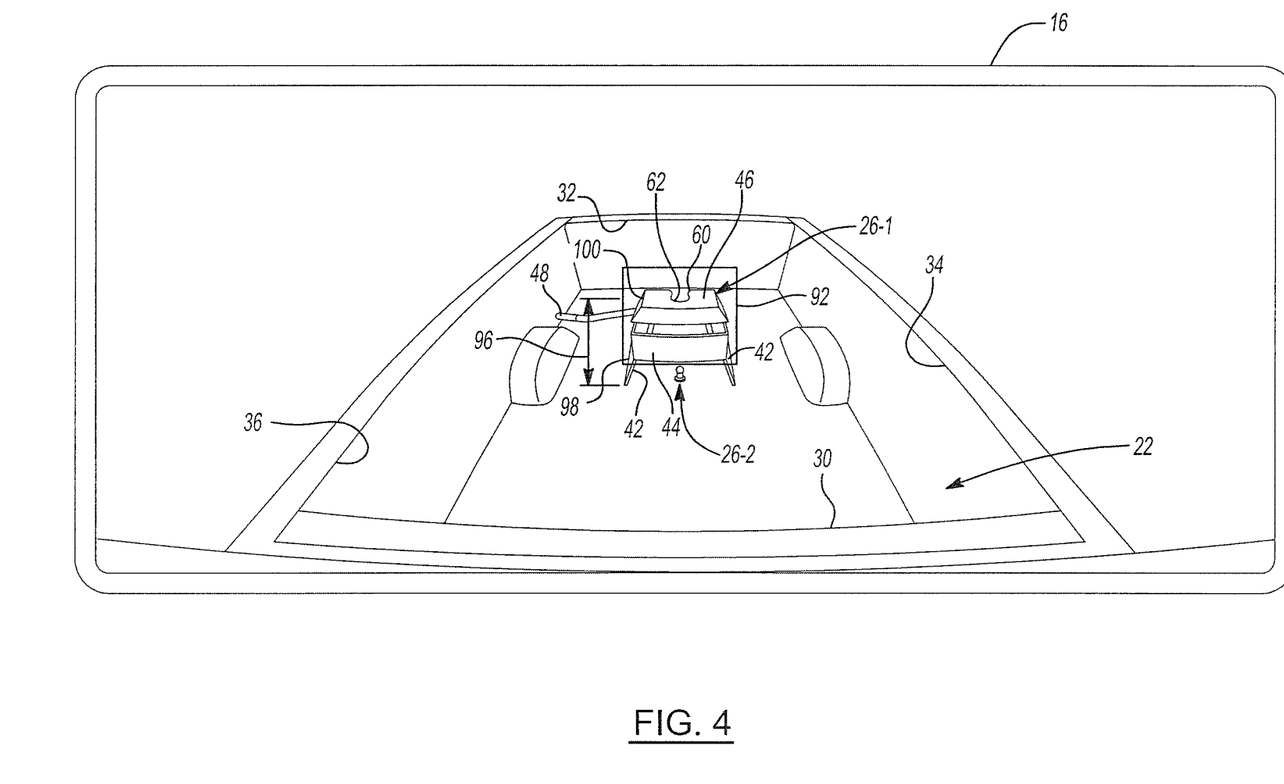
FIG. 4 is the example image of the cargo bed of FIG. 2 and a fifth wheel envelop overlaid on the image according to the principles of the present disclosure.
Figure 5:
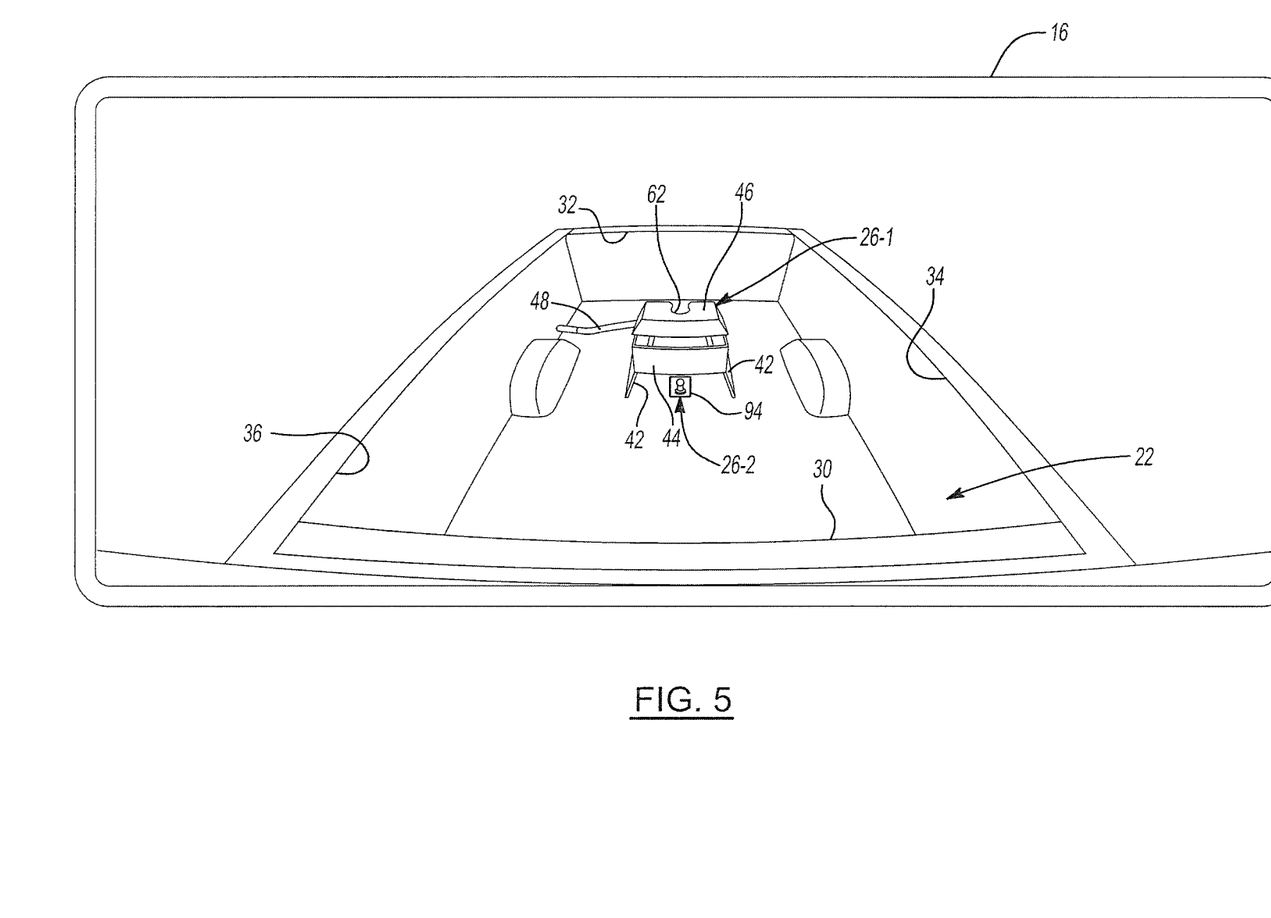
FIG. 5 is the example image of the cargo bed of FIG. 2 and a gooseneck envelop overlaid on the image according to the principles of the present disclosure.

Each of the fifth wheel envelop 92 and the gooseneck envelop 94 may have a square shape, as shown. The fifth wheel envelop 92 may have a first predetermined size, and the gooseneck envelop 94 may have a second predetermined size that is less than the first predetermined size. The edge detection module 84 may determine the locations of the fifth wheel envelop 92 and the gooseneck envelop 94 based on the location(s) of the interior edge(s) 30, 32, 34, and/or 36 of the cargo bed 22. For example, the fifth wheel envelop 92 and the gooseneck envelop 94 may have predetermined locations relative to the locations of the interior edges 30, 32, 34, 36 of the cargo bed 22.

The hitch identification module 86 identifies whether the edges detected by the edge detection module 84 correspond to the edges of one of the trailer hitches 26. The hitch identification module 86 may determine that a detected edge corresponds to an edge of one of the trailer hitches 26 when the location, curvature, and/or length of the detected edge is within a predetermined range of an expected value of the location, curvature, and/or length of the trailer hitch edge, respectively. Determining that a detected edge corresponds to an edge of one of the trailer hitches 26 may be referred to as detecting the trailer hitch edge.

The hitch identification module 86 may determine the location, curvature, and length of a detected edge based on a predetermined relationship between a number of pixels in the image and a corresponding distance. For example, the hitch identification module 86 may use this predetermined relationship to determine the location of a point of an edge based on the number of pixels in the image between the point and one or more of the interior edges 30, 32, 34, 36 of the cargo bed 22. The hitch identification module 86 may identify that detected edge corresponds to an edge of one of the trailer hitches 26 when a predetermined number of points are located on or within a predetermined distance of the trailer hitch edge.

The hitch identification module 86 may identify that one of the trailer hitches 26 is present when the number of detected edges corresponding to the edges of the one of the trailer hitches 26 is greater than or equal to a predetermined number. In one example, the hitch identification module 86 identifies that the fifth wheel hitch 26-1 is present when the vertical front edges 50 of the legs 42, the vertical front edges 52 of the base 44, the horizontal front edges 54 of the base 44, the vertical front edges 56 of the head 46, and/or the horizontal front edges 58 of the head 46 is/are detected. In another example, the hitch identification module 86 identifies that the gooseneck hitch 26-2 is present when the vertical side edges 68 of the shank 64 and/or the and the outer perimeter edge 70 of the ball 66 is/are detected.

The hitch identification module 86 also identifies the type and/or size of the one of the trailer hitches 26 detected based on the edges detected by the edge detection module 84, and outputs a signal indicating the type and/or size of the trailer hitches 26 identified. The hitch identification module 86 may identify the type of the trailer hitches 26 by determining whether the trailer hitches 26 are a fifth wheel hitch or a gooseneck hitch. The hitch identification module 86 may identify the size of the trailer hitches 26 by determining the heights of the trailer hitches 26.

The hitch identification module 86 may identify the fifth wheel hitch 26-1 and/or the height of the fifth wheel hitch 26-1 based on the edges detected within the fifth wheel envelop 92. The hitch identification module 86 may identify the gooseneck hitch 26-2 and/or the height of the gooseneck hitch 26-2 based on the edges detected within the gooseneck envelop 94. The edge detection module 84 may analyze the portion of the image disposed within the fifth wheel envelop 92 before analyzing the portion of the image disposed within the gooseneck envelop 94. If the hitch identification module 86 identifies the fifth wheel hitch 26-1 based on the edges detected within the fifth wheel envelop 92, the edge detection module 84 may not analyze the portion of the image disposed within the gooseneck envelop 94. Otherwise, the edge detection module 84 may proceed with analyzing the portion of the image disposed within the gooseneck envelop 94.

Referring briefly to FIG. 4, a height 96 of the fifth wheel hitch 26-1 extends from a lower edge 98 of the legs 42 to an upper edge 100 of the head 46. Thus, the hitch identification module 86 may determine the distance between the lower edge 98 of the legs 42 and the upper edge 100 of the head 46 to obtain the height 96 of the fifth wheel hitch 26-1. Referring briefly to FIG. 2B, a height 102 of the gooseneck hitch 26-2 extends from a lower edge 104 of the shank 64 to an uppermost point 106 of the ball 66. Thus, the hitch identification module 86 may determine the distance between the lower edge 104 of the shank 64 and the uppermost point 106 of the ball 66 to obtain the height 102 of the gooseneck hitch 26-2.

The guidance line module 88 outputs a signal indicating a guidance line for attaching a trailer to one of the trailer hitches 26. The guidance line module 88 determines a starting point, a radius or curvature, and a length of the guidance line. The guidance line module 88 determines the starting point of the guidance line based on the type and/or size of the trailer hitches 26 identified by the hitch identification module 86.

Figure 6:
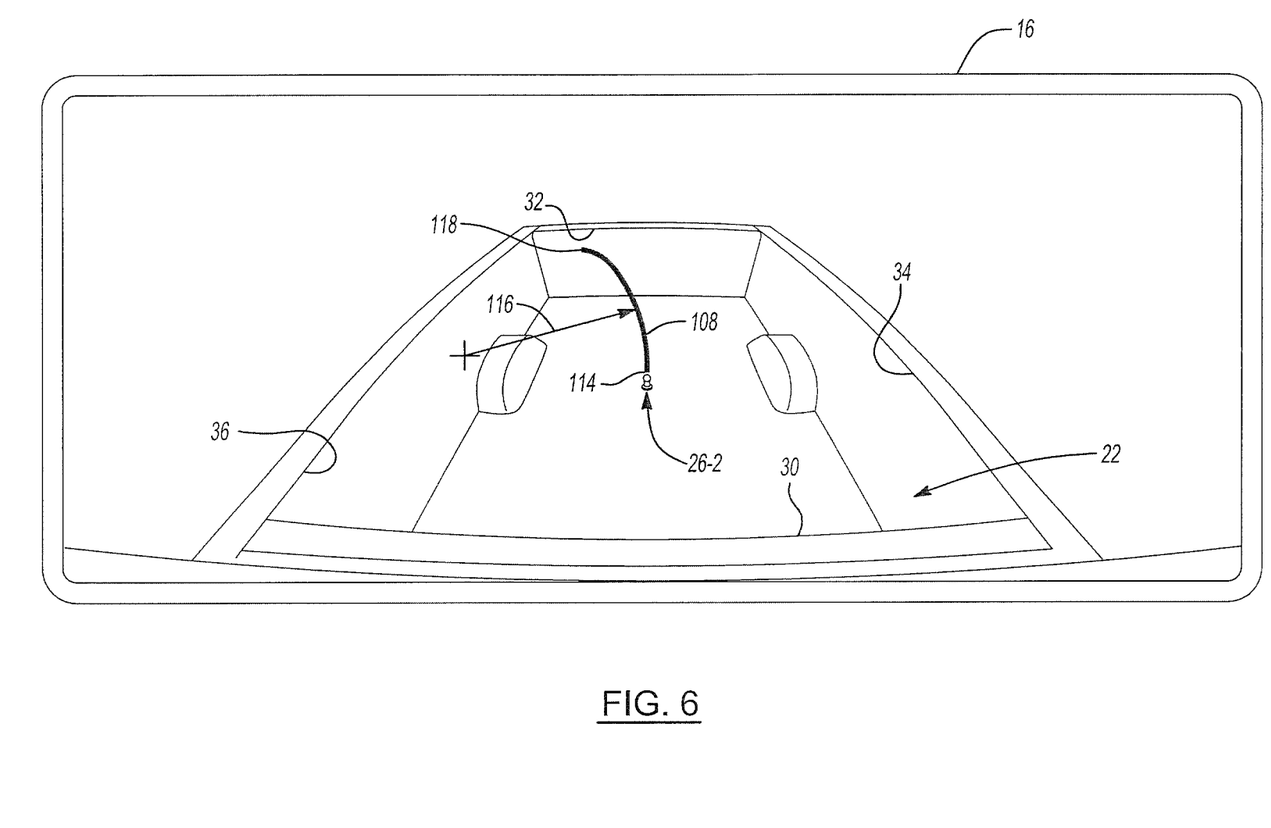
FIG. 6 is the example image of the cargo bed of FIG. 2 and a first guidance line overlaid on the image according to the principles of the present disclosure, where the first guidance line is for attaching a trailer to a gooseneck hitch.
Figure 7:
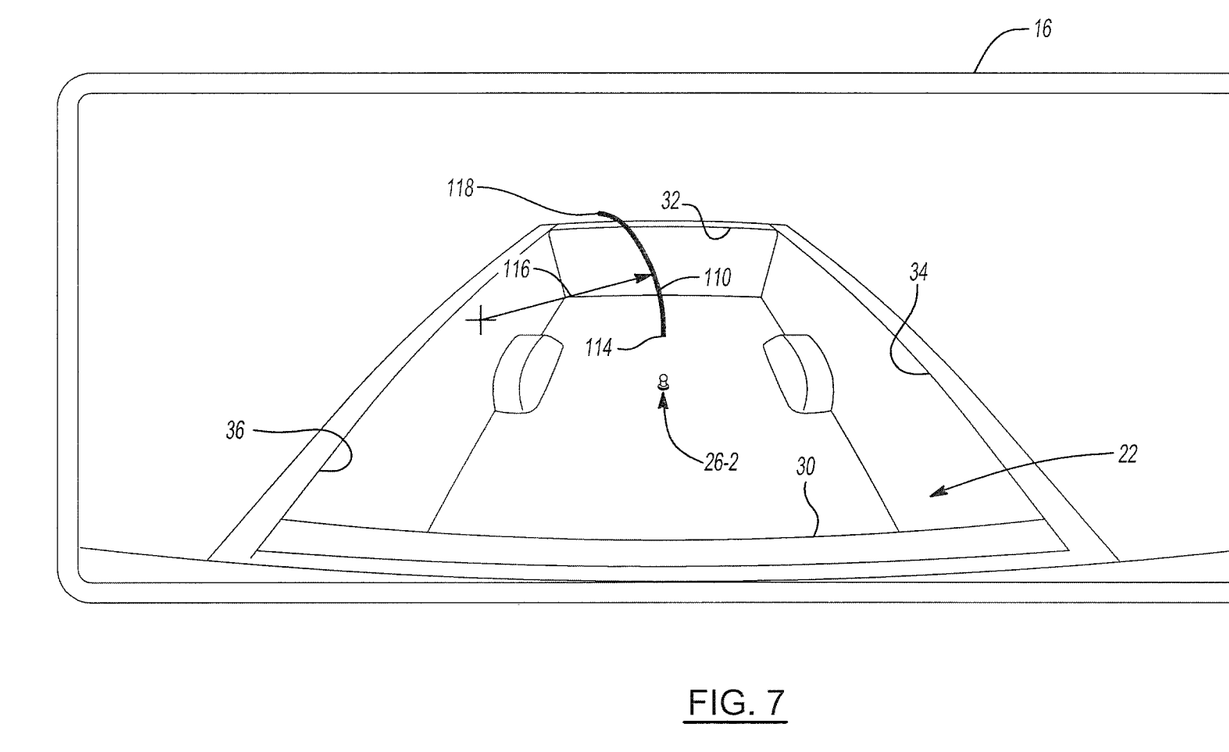
FIG. 7 is the example image of the cargo bed of FIG. 2 and a second guidance line overlaid on the image according to the principles of the present disclosure, where the second guidance line is for attaching a trailer to a first fifth wheel hitch having a first height.
Figure 8:
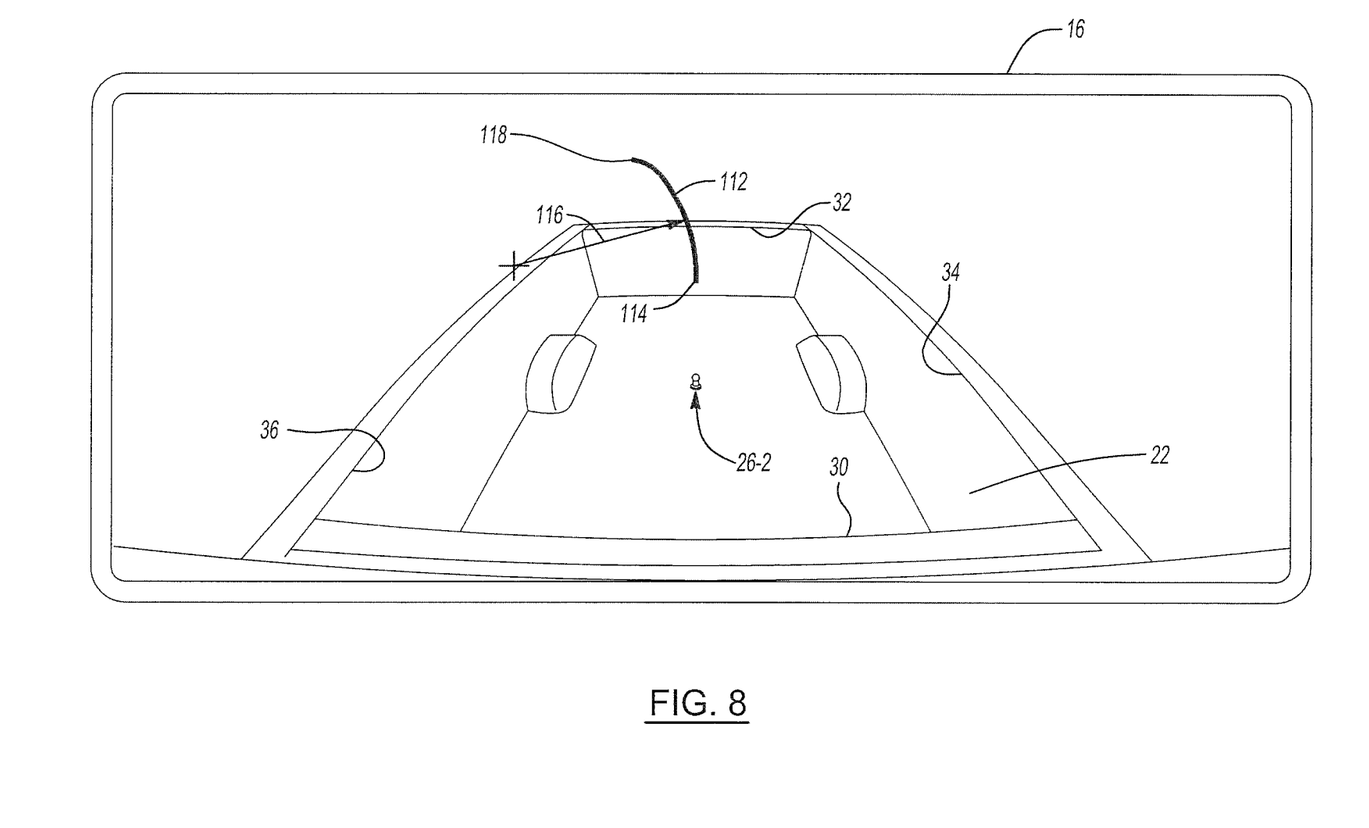
FIG. 8 is the example image of the cargo bed of FIG. 2 and a third guidance line overlaid on the image according to the principles of the present disclosure, where the third guidance line is for attaching a trailer to a second fifth wheel hitch having a second height.

Referring now to FIGS. 6 through 8, examples of guidance lines generated by the guidance line module 88 for attaching a trailer to the trailer hitches 26 is shown. The guidance lines include a first guidance line 108 (FIG. 6) for attaching a gooseneck trailer to the gooseneck hitch 26-2, a second guidance line 110 (FIG. 7) for attaching a fifth wheel trailer to the fifth wheel hitch 26-1, and a third guidance line 112 (FIG. 8) for attaching a fifth wheel trailer to the second fifth wheel hitch. Each of the guidance lines 108, 110, 112 has a starting point 114, a radius 116, and an ending point 118. The length of each of the guidance lines 108, 110, 112 extends from the starting point 114 to the ending point 118.

The guidance line module 88 may determine the starting point 114 of each guidance line based on the type and/or height of the trailer hitches 26 identified by the hitch identification module 86. For example, if the gooseneck hitch 26-2 is identified, the guidance line module 88 may locate the starting point 114 at or near the uppermost point 106 of the gooseneck hitch 26-2. In another example, if the fifth wheel hitch 26-1 is identified, the guidance line module 88 may locate the starting point 114 within the U-shaped pocket 62 of the fifth wheel hitch 26-1.

The guidance line module 88 may locate the starting point 114 at or near a hitching point that corresponds to the type and/or height of the trailer hitches 26 identified by the hitch identification module 86. For example, briefly referring to FIG. 2A, if the gooseneck hitch 26-2 is identified, guidance line module 88 may locate the starting point 114 at or near (at a predetermined location relative to) the first hitching point 72. In another example, if the fifth wheel hitch 26-1 is identified, the guidance line module 88 may locate the starting point 114 at or near the second hitching point 74. In yet another example, if the second fifth wheel hitch is identified, the guidance line module 88 may locate the starting point 114 at or near the third hitching point 76.

The guidance line module 88 may select the starting point 114 from a plurality of predetermined starting points based on the type and/or height of the trailer hitches 26 identified by the hitch identification module 86. For example, if the gooseneck hitch 26-2 is identified, the guidance line module 88 may select a starting point that is at a first predetermined location relative to one or more of the interior edges 30, 32, 34, 36 of the cargo bed 22. In another example, if the fifth wheel hitch 26-1 is identified, the guidance line module 88 may select a starting point that is at a second predetermined location relative to one or more of the interior edges 30, 32, 34, 36 of the cargo bed 22. In yet another example, if the second fifth wheel hitch is identified, the guidance line module 88 may select a starting point that is at a third predetermined location relative to one or more of the interior edges 30, 32, 34, 36 of the cargo bed 22.

The guidance line module 88 may determine the radius 116 of each guidance line based on the steering wheel angle measured by the SWA sensor 20 using, for example, a function or mapping of steering wheel angle to the radius 116. In this regard, each guidance line indicates the future path of one of the trailer hitches 26 as the vehicle 10 is moved rearward to attach a trailer to the one of the trailer hitches 26. Thus, the guidance line module 88 may adjust the radius 116 of the guidance line as the driver rotates the steering wheel.

The guidance line module 88 may determine the ending point 118 of each guidance line based on a distance between the identified trailer hitch and the rear end of the vehicle 10. For example, the guidance line module 88 may locate the ending point 118 of each guidance line so that the guidance line extends a predetermined distance (e.g., 5 feet) beyond the rear end of the vehicle 10. Thus, the length of each guidance line may be equal to a sum of (i) the distance between the identified trailer hitch and the rear end of the vehicle 10, and (ii) the predetermined distance. The guidance line module 88 may assume that the location of the rear interior edge 32 of the cargo bed 22 along the x-axis 78 is a predetermined distance (e.g., zero) forward of the location of the rear end of the vehicle 10 along the x-axis 78.

The display control module 90 controls the display 16 to display the image generated by the cargo bed camera 24 and to display the guidance lines over the image generated by the cargo bed camera 24. The display control module 90 may control the display 16 to display the first guidance line 108 when the gooseneck hitch 26-2 is identified if the fifth wheel hitch 26-1 and/or the second fifth wheel hitch is/are not also identified. The display control module 90 may control the display 16 to display the second guidance line 110 when the fifth wheel hitch 26-1 is identified regardless of whether the gooseneck hitch 26-2 is also identified.

Figure 9:
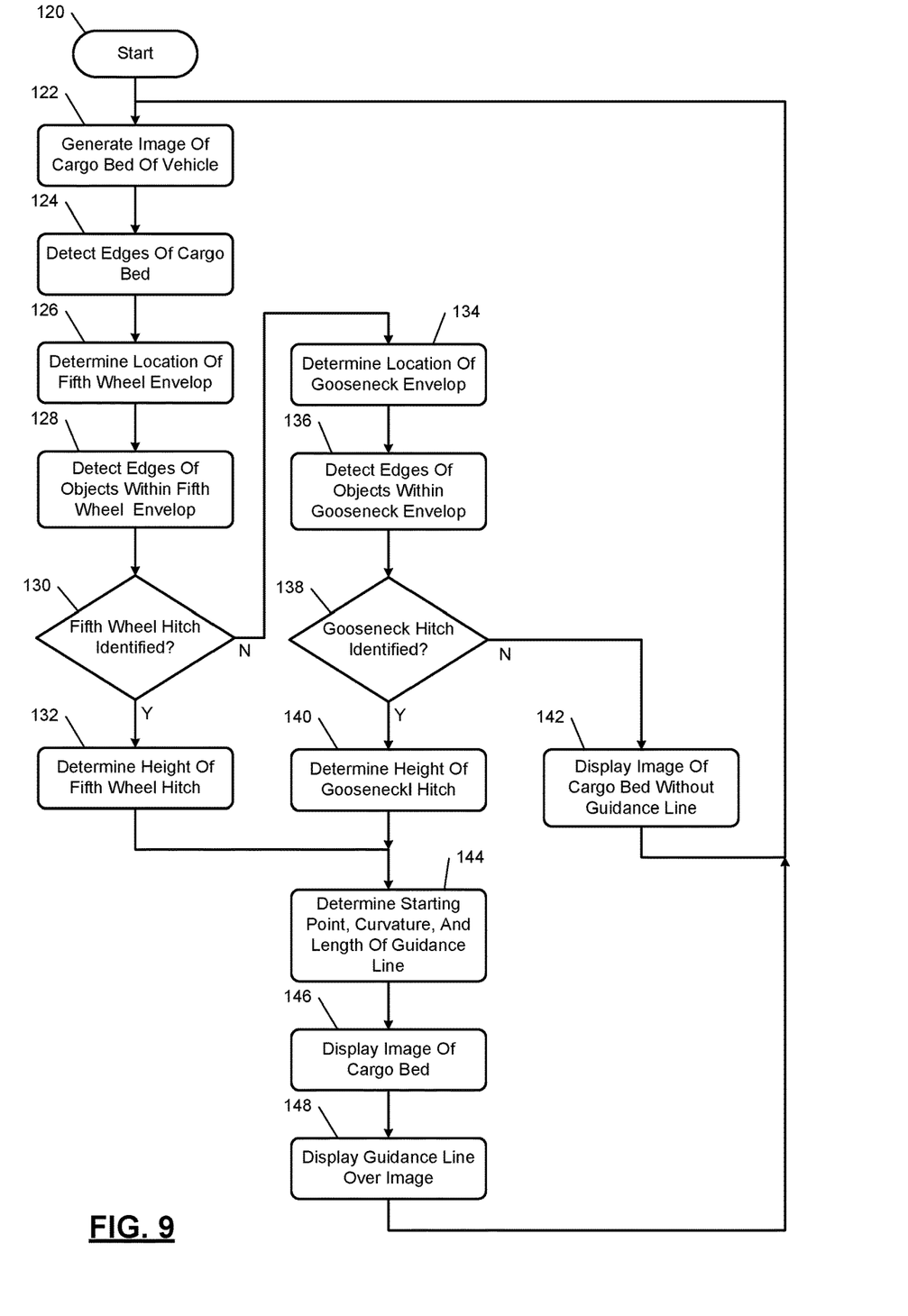
FIG. 9 is a flowchart illustrating an example method of generating a guidance line for attaching a trailer to a gooseneck or fifth wheel hitch according to the principles of the present disclosure.

Referring now to FIG. 9, an example method of generating a guidance line for attaching a trailer to a gooseneck or fifth wheel hitch begins at 120. The method is described in the context of the modules of FIG. 3. However, the particular modules that perform the steps of the method may be different than the modules mentioned below, or the method may be implemented apart from the modules of FIG. 3.

At 122, the cargo bed camera 24 generates the image of the cargo bed 22 of the vehicle 10. At 124, the edge detection module 84 detects the interior edges of the cargo bed 22 including the front interior edge 30, the rear interior edge 32, the left side interior edge 34, and the right side interior edge 36. At 126, the edge detection module 84 determines the location of the fifth wheel envelop 92 based on the interior edges of the cargo bed 22. At 128, the edge detection module 84 detects edges of objects within the fifth wheel envelop 92.

At 130, the hitch identification module 86 determines whether a fifth wheel hitch is identified. The hitch identification module 86 may determine that a fifth wheel hitch is present within the fifth wheel envelop 92 when at least a predetermined portion of at least a predetermined number of edges of the fifth wheel hitch is detected. If a fifth wheel hitch is identified, the method continues at 132. Otherwise, the method continues at 134.

At 132, the hitch identification module 86 determines the height of the fifth wheel hitch. The hitch identification module 86 may determine whether the fifth wheel hitch corresponds to the fifth wheel hitch 26-1 or the second fifth wheel hitch based on the height of the fifth wheel hitch. At 134, the edge detection module 84 determines the location of the gooseneck envelop 94 based on the interior edges of the cargo bed 22. At 136, the edge detection module 84 detects edges of objects within the gooseneck envelop 94.

At 138, the hitch identification module 86 determines whether the gooseneck hitch 26-2 is identified. The hitch identification module 86 may determine that the gooseneck hitch 26-2 is present within the gooseneck envelop 94 when at least a predetermined portion of at least a predetermined number of edges of the gooseneck hitch 26-2 is detected. If the gooseneck hitch 26-2 is identified, the method continues at 140. Otherwise, the method continues at 142. At 142, the display control module 90 controls the display 16 to display the image of the cargo bed 22 without the guidance line.

At 140, the hitch identification module 86 determines the height of the gooseneck hitch 26-2. At 144, the guidance line module 88 determines the starting point, curvature, and length of the guidance line based on the type and/or height of the identified trailer hitch. At 146, the display control module 90 controls the display 16 to display the image of the cargo bed 22 generated by the cargo bed camera 24. At 148, the display control module 90 controls the display 16 to display the guidance line over the image of the cargo bed 22.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
an edge detection circuit configured to detect edges of an object within an image of a cargo bed of a vehicle;
a hitch identification circuit configured to identify at least one of a type of a trailer hitch attached to the cargo bed and a size of the trailer hitch based on the detected edges of the object;
a guidance line circuit configured to determine a starting point of a guidance line for connecting a trailer to the trailer hitch based on at least one of the type of the trailer hitch and the size of the trailer hitch; and
a display control circuit configured to control an electronic display to display the image of the cargo bed and to display the guidance line on the image of the cargo bed, wherein:
the edge detection circuit is configured to detect edges of the object within a fifth wheel envelop that includes a first portion of the image of the cargo bed;
the hitch identification circuit is configured to identify whether the trailer hitch is a fifth wheel hitch based on the detected edges of the object within the fifth wheel envelop;
the edge detection circuit is configured to detect edges of the object within a gooseneck envelop that includes a second portion of the image of the cargo bed; and
the hitch identification circuit is configured to identify whether the trailer hitch is a gooseneck hitch based on the detected edges of the object within the gooseneck envelop.

2. The system of claim 1 wherein the edge detection circuit is configured to detect edges of the object within the gooseneck envelop when the hitch identification circuit identifies that no fifth wheel hitch is present within the fifth wheel envelop.

3. The system of claim 1 wherein the fifth wheel envelop has a first predetermined size, and the gooseneck envelop has a second predetermined size that is less than the first predetermined size.

4. The system of claim 1 wherein:
the edge detection circuit is configured to detect edges of the cargo bed; and
at least one of the fifth wheel envelop and the gooseneck envelop have a predetermined location relative to the detected edges of the cargo bed.

5. A method comprising:
detecting edges of an object within an image of a cargo bed of a vehicle;
identifying at least one of a type of a trailer hitch attached to the cargo bed and a size of the trailer hitch based on the detected edges of the object;
determining a starting point of a guidance line for connecting a trailer to the trailer hitch based on at least one of the type of the trailer hitch and the size of the trailer hitch, wherein the guidance line indicates a future path of the trailer hitch corresponding to an angle of a steering wheel of the vehicle;
controlling an electronic display to display the image of the cargo bed and to display the guidance line on the image of the cargo bed;
detecting edges of the object within a fifth wheel envelop that includes a first portion of the image of the cargo bed;
identifying whether the trailer hitch is a fifth wheel hitch based on the detected edges of the object within the fifth wheel envelop;
detecting edges of the object within a gooseneck envelop that includes a second portion of the image of the cargo bed; and
identifying whether the trailer hitch is a gooseneck hitch based on the detected edges of the object within the gooseneck envelop.

6. The method of claim 5 further comprising detecting edges of the object within the gooseneck envelop in response to identifying that no fifth wheel hitch is present within the fifth wheel envelop.

7. The method of claim 5 wherein the fifth wheel envelop has a first predetermined size, and the gooseneck envelop has a second predetermined size that is less than the first predetermined size.

8. The method of claim 5 further comprising detecting edges of the cargo bed, wherein at least one of the fifth wheel envelop and the gooseneck envelop have a predetermined location relative to the detected edges of the cargo bed.

* * * * *